United States Patent
Kapoor et al.

(10) Patent No.: US 9,424,340 B1
(45) Date of Patent: *Aug. 23, 2016

(54) DETECTION OF PROXY PAD SITES

(71) Applicant: Google Inc., Mountain View, CA (US)

(72) Inventors: Rupesh Kapoor, Mountain View, CA (US); David Michael Proudfoot, Mountain View, CA (US); Joachim Kupke, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/521,078

(22) Filed: Oct. 22, 2014

Related U.S. Application Data

(63) Continuation of application No. 12/345,188, filed on Dec. 29, 2008, now Pat. No. 8,874,565.

(60) Provisional application No. 61/018,120, filed on Dec. 31, 2007.

(51) Int. Cl.
*G06F 17/30* (2006.01)

(52) U.S. Cl.
CPC ..... *G06F 17/30613* (2013.01); *G06F 17/3053* (2013.01); *G06F 17/3071* (2013.01); *G06F 17/30864* (2013.01)

(58) Field of Classification Search
CPC .................. G06F 17/30705–17/30713
See application file for complete search history.

(56) References Cited

U.S. PATENT DOCUMENTS

| | | | |
|---|---|---|---|
| 6,353,813 B1 * | 3/2002 | Breese | G06F 17/30867 700/99 |
| 6,374,241 B1 | 4/2002 | Lamburt et al. | |
| 7,062,487 B1 | 6/2006 | Nagaishi et al. | |
| 7,568,148 B1 * | 7/2009 | Bharat | G06F 17/3071 707/999.007 |
| 8,260,786 B2 * | 9/2012 | DeCoste | G06F 17/30707 707/748 |
| 8,412,718 B1 * | 4/2013 | Bilger | G06Q 30/0631 705/14.4 |
| 8,442,984 B1 * | 5/2013 | Pennock | G06Q 10/0639 707/748 |
| 8,498,990 B2 * | 7/2013 | Heber | G06Q 10/00 707/748 |
| 8,554,601 B1 * | 10/2013 | Marsh | G06Q 30/02 705/7.32 |
| 8,874,565 B1 | 10/2014 | Kapoor et al. | |
| 2002/0055940 A1 | 5/2002 | Elkan | |
| 2007/0043761 A1 * | 2/2007 | Chim | G06F 17/30643 |
| 2007/0106758 A1 * | 5/2007 | Chi | G06F 17/30882 709/219 |
| 2007/0192300 A1 * | 8/2007 | Reuther | G06F 17/30427 |
| 2008/0005090 A1 * | 1/2008 | Khan | G06F 17/30864 |
| 2008/0059536 A1 * | 3/2008 | Brock | G06F 21/10 |
| 2008/0082481 A1 * | 4/2008 | Joshi | G06F 17/30861 |
| 2008/0178302 A1 * | 7/2008 | Brock | G06F 17/30864 726/32 |
| 2008/0256049 A1 * | 10/2008 | Katwala | G06F 17/30867 |

* cited by examiner

*Primary Examiner* — Robert Beausoliel, Jr.
*Assistant Examiner* — Nirav K Khakhar
(74) *Attorney, Agent, or Firm* — Fish & Richardson P.C.

(57) ABSTRACT

A system may identify a set of first documents associated with an organization, and identify clusters to which the first documents belong. Each of a number of the identified clusters may include a group of documents that includes one of the first documents and one or more second documents associated with one or more different organizations. The system may determine a quality score for each of the documents in each of the identified clusters, and determine, for each of the number of the identified clusters, whether the quality score of the one of the first documents in the identified cluster is higher than the quality score of the one or more second documents in the identified cluster. The system may generate a proxy pad score based on the determinations, and store the proxy pad score.

34 Claims, 15 Drawing Sheets

| ORG. A.COM | NO. OF DOCS | TOTAL SCORE |
|---|---|---|
| TRIVIAL | 2 | +110 |
| WINNER | 1 | +60 |
| LOSER | 3 | -156 |

FIG. 11A

| ORG. A.COM | ORG. | NO. OF TIMES |
|---|---|---|
| LOST | B.COM | 1 |
| LOST | G.COM | 1 |
| LOST | T.COM | 1 |

FIG. 11B

| | |
|---|---|
| LOST TO ORG B.COM | 10000 TIMES |
| LOST TO ORG C.COM | 8000 TIMES |
| LOST TO ORG D.COM | 7000 TIMES |
| LOST TO ORG E.COM | 6000 TIMES |
| LOST TO ORG F.COM | 3000 TIMES |
| LOST TO ORG G.COM | 1000 TIMES |
| LOST TO ORG H.COM | 400 TIMES |
| LOST TO ORG I.COM | 75 TIMES |
| ⋮ | |
| LOST TO ORG.COM Y | 1 TIME |

HEAD: rows 1-3. TAIL: rows 4 through last.

HEAD = 25000

TAIL = 18500

$$\text{SPAM SCORE} = \frac{\text{TAIL}}{\text{HEAD}} = \frac{18500}{25000}$$

FIG. 11C

DETECTION OF PROXY PAD SITES

RELATED APPLICATIONS

This application is a continuation of U.S. patent application Ser. No. 12/345,188, filed on Dec. 29, 2008 (now U.S. Pat. No. 8,874,565), which claims priority under 35 U.S.C. §119(e) based on U.S. Provisional Application Ser. No. 61/018,120, filed Dec. 31, 2007, the disclosures of which are incorporated herein by reference.

BACKGROUND

The World Wide Web ("web") contains a vast amount of information that is ever-changing. Existing web-based information retrieval systems use web crawlers to identify information on the web. A web crawler is a program that exploits the link-based structure of the web to browse the web in a methodical, automated manner.

A web crawler may start with addresses (e.g., Uniform Resource Locators (URLs)) of links to visit. For each address on the list, the web crawler may visit the document associated with the address. The web crawler may identify outgoing links within the visited document and add addresses associated with these links to the list of addresses.

An indexer creates an index of the documents crawled by the web crawler. A problem that indexers face is how to handle duplicate content on the web. For example, the same document may appear duplicated or substantially duplicated in different forms or at different places on the web. Also, spammers oftentimes copy document content and pass this content off as their own.

It is undesirable for the indexer to index all of the duplicate documents. For example, indexing duplicate documents wastes space in the index. Also, indexing duplicate documents, and thus, making the duplicate documents available for serving as search results lead to an undesirable experience for the user. A user does not want to be presented with multiple documents containing the same, or substantially the same, content.

Thus, given a set of duplicate documents, an indexer may select one of these documents to index. Determining which of the duplicate documents to index is not an easy task because it would be undesirable for the indexer to select a document belonging to a spammer.

SUMMARY

According to one aspect, an automated method may include identifying a set of first documents associated with an organization; identifying clusters to which the first documents belong, each of a number of the identified clusters including a group of documents that includes one of the first documents and one or more second documents associated with one or more different organizations; determining a quality score for each of the documents in each of the identified clusters; determining, for each of the number of the identified clusters, whether the quality score of the one of the first documents in the identified cluster is higher than the quality score of the one or more second documents in the identified cluster; generating a proxy pad score based on the determination, for each of the number of the identified clusters, of whether the quality score of the one of the first documents in the identified cluster is higher than the quality score of the one or more second documents in the identified cluster; and storing the proxy pad score.

According to another aspect, a system implemented within one or more computer devices may be provided. The system may include means for identifying a set of first documents associated with an organization; and means for identifying clusters to which the first documents belong, a number of the identified clusters including a group of documents that includes one of the first documents and one or more second documents associated with one or more different organizations. The system may also include means for determining a quality score for each of the documents in each of the identified clusters; means for identifying the one of the first documents in one or more of the number of the identified clusters as a winner when the quality score of the one of the first documents is higher than the quality scores of the one or more second documents; means for identifying the one of the first documents in another one or more of the number of the identified clusters as a loser when the quality score of the one of the first documents is lower than the quality score of one of the one or more second documents; means for determining a likelihood that the organization copies content from the one or more different organizations based on information regarding the one or more identified winners and information regarding the one or more identified losers; and means for storing information regarding the likelihood that the organization copies content from the one or more different organizations.

According to yet another aspect, a system may include at least one memory and at least one processor that is connected to the at least one memory. The at least one processor may identify a set of first documents associated with an organization, and identify clusters to which the first documents belong. A number of the identified clusters may include a group of documents including one of the first documents and one or more second documents associated with one or more other organizations. The at least one processor may also determine a quality score for each of the documents in each of the identified clusters, compare, for each of the number of the identified clusters, the quality score of the one of the first documents to the quality scores of the one or more second documents in the identified cluster, generate a proxy pad score based on results of the comparisons, and store the proxy pad score in the memory.

According to a further aspect, a computer-readable medium may contain computer-executable instructions. The computer-readable medium may include one or more instructions for identifying a set of first documents associated with an organization; one or more instructions for identifying clusters to which the first documents belong, a number of the identified clusters including a group of documents that includes one of the first documents and one or more second documents associated with one or more different organizations; one or more instructions for determining a quality score for each of the documents in each of the identified clusters; one or more instructions for comparing, for each of the number of the identified clusters, the quality score of the one of the first documents in the identified cluster to the quality score of the one or more second documents in the identified cluster; one or more instructions for generating a proxy pad score for the organization based on results of the comparisons; one or more instructions for selectively choosing, for each of the number of the identified clusters, one of the first documents in the identified cluster based on the proxy pad score for the organization; and one or more instructions for indexing the first documents when the first documents are chosen.

According to another aspect, an automated method may include identifying a cluster of duplicate documents; determining a measure of quality associated with each document in the cluster of duplicate documents; ranking the documents in the cluster of duplicate documents based on the measure of quality associated with each of the documents; modifying the measure of quality associated with one of the documents based on a proxy pad score that reflects a likelihood that an organization, with which the one of the documents is associated, copies content from other organizations; selectively choosing the one of the documents as representative of the cluster based on the modified measure of quality; and indexing the one of the documents when the one of the documents is chosen as the representative of the cluster.

BRIEF DESCRIPTION OF THE DRAWINGS

The accompanying drawings, which are incorporated in and constitute a part of this specification, illustrate one or more embodiments described herein and, together with the description, explain these embodiments. In the drawings:

FIG. 11A is a diagram illustrating a first exemplary table that may be generated;

FIG. 11B is a diagram illustrating a second exemplary table that may be generated;

FIG. 11C is a diagram illustrating information that may be used to calculate a spam score;

DETAILED DESCRIPTION

The following detailed description refers to the accompanying drawings. The same reference numbers in different drawings may identify the same or similar elements. Also, the following detailed description does not limit the invention.

Overview

In the description to follow, reference will be made to "documents" and "web sites." A "document," as the term is used herein, is to be broadly interpreted to include any machine-readable and machine-storable work product. In the context of the Internet, a common document is a web page. Web pages often include textual information and may include embedded information (such as meta information, images, hyperlinks, etc.) and/or embedded instructions (such as Javascript, etc.). A "web site," as used herein, is to be broadly interpreted to include a collection of related documents, such as documents associated with a same host, domain, or organization. For example, the collection of related documents might include all or a subset of the documents associated with a traditional web site, directory, or sub-directory, or some other set of documents that are related to each other (e.g., on the same host or associated with the same domain or organization).

In the context of indexing, the presence of duplicate documents (i.e., documents with the same or substantially the same content) may pose problems by wasting resources (e.g., computer, storage, and/or network resources) and degrading a user's search experience (e.g., by presenting multiple documents with essentially the same content). One technique described herein may select one duplicate document, as representative of a cluster of duplicate documents, to index. This "representative" document can then be served with search results.

Implementations described herein may identify proxy pads and reduce the chances that the proxy pads will be selected to represent a cluster of duplicate documents. A "proxy pad," as used herein, may include a document or a collection of documents associated with a web site whose main purpose is to copy content from documents associated with a number of other organizations (e.g., other web site owners or hosts). Spammers may use proxy pads to spam the index of a search engine. For example, spammers may create or buy links that point to the proxy pad in an attempt to get the proxy pad selected for indexing and served as search results for certain keywords.

Figure 1A:
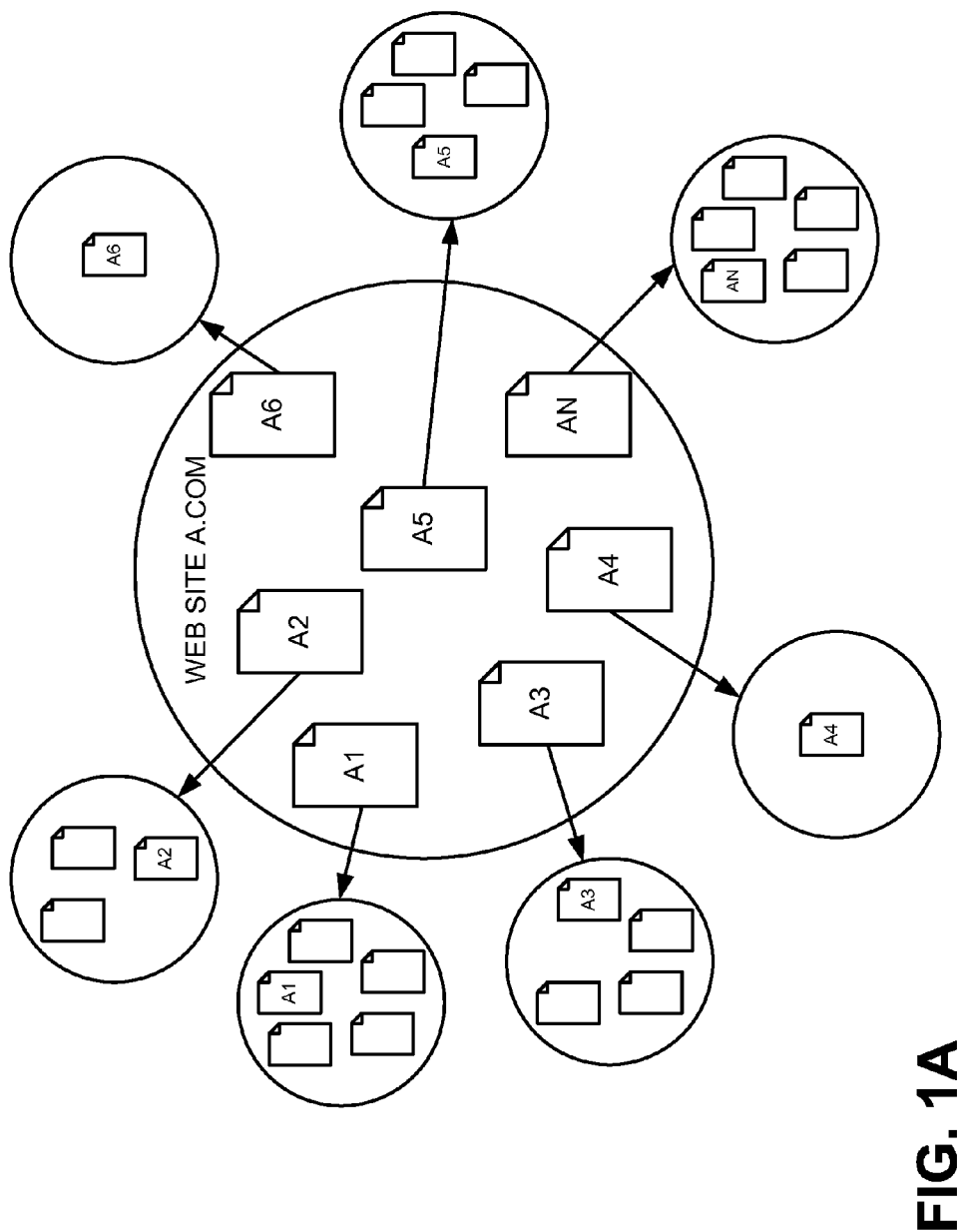
FIGS. 1A and 1B are diagrams of an overview of an exemplary implementation described herein.
Figure 1B:
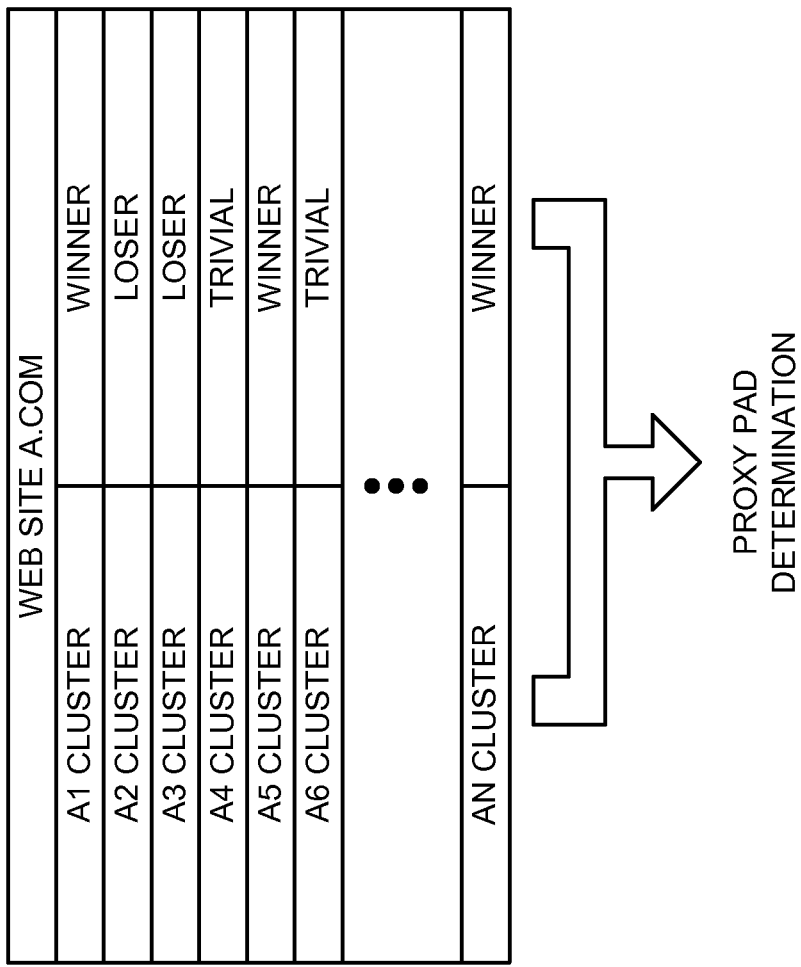

FIGS. 1A and 1B are diagrams of an overview of an exemplary implementation described herein. As shown in FIG. 1A, a collection of documents associated with a web site A.com may be analyzed. For example, it may be determined in which duplicate cluster each of the documents belongs. A duplicate cluster may include one or more documents, even a million or more documents, that have duplicate (or substantially duplicate) content. As shown in FIG. 1A, documents A4 and A6 have unique content and, thus, each of their duplicate clusters contains a single document. Documents A1, A2, A3, A5, and AN are shown in FIG. 1A as being in duplicate clusters having various numbers of duplicate documents.

The documents in each of the duplicate clusters may be scored in some manner. For example, a quality score, such as a link-based score, may be determined for each of the documents in each of the duplicate clusters. Each of the duplicate clusters may then be analyzed to determine whether the documents associated with web site A.com were winners, losers, or trivials, as shown in FIG. 1B. A document may be a winner if its quality score is higher than the quality scores of all of the other documents in the duplicate cluster. A document may be a loser if its quality score is lower than the quality score of at least one other document in the duplicate cluster. A document may be a trivial if it is the only document in the duplicate cluster, or there are multiple documents in the duplicate cluster but they are all associated with the same web site. Information regarding the winners, losers, and trivials may be used to determine a proxy pad score that reflects a likelihood of whether web site A.com is a proxy pad (i.e., an organization whose main purpose is to copy content of other organizations).

Exemplary Network Configuration

Figure 2:
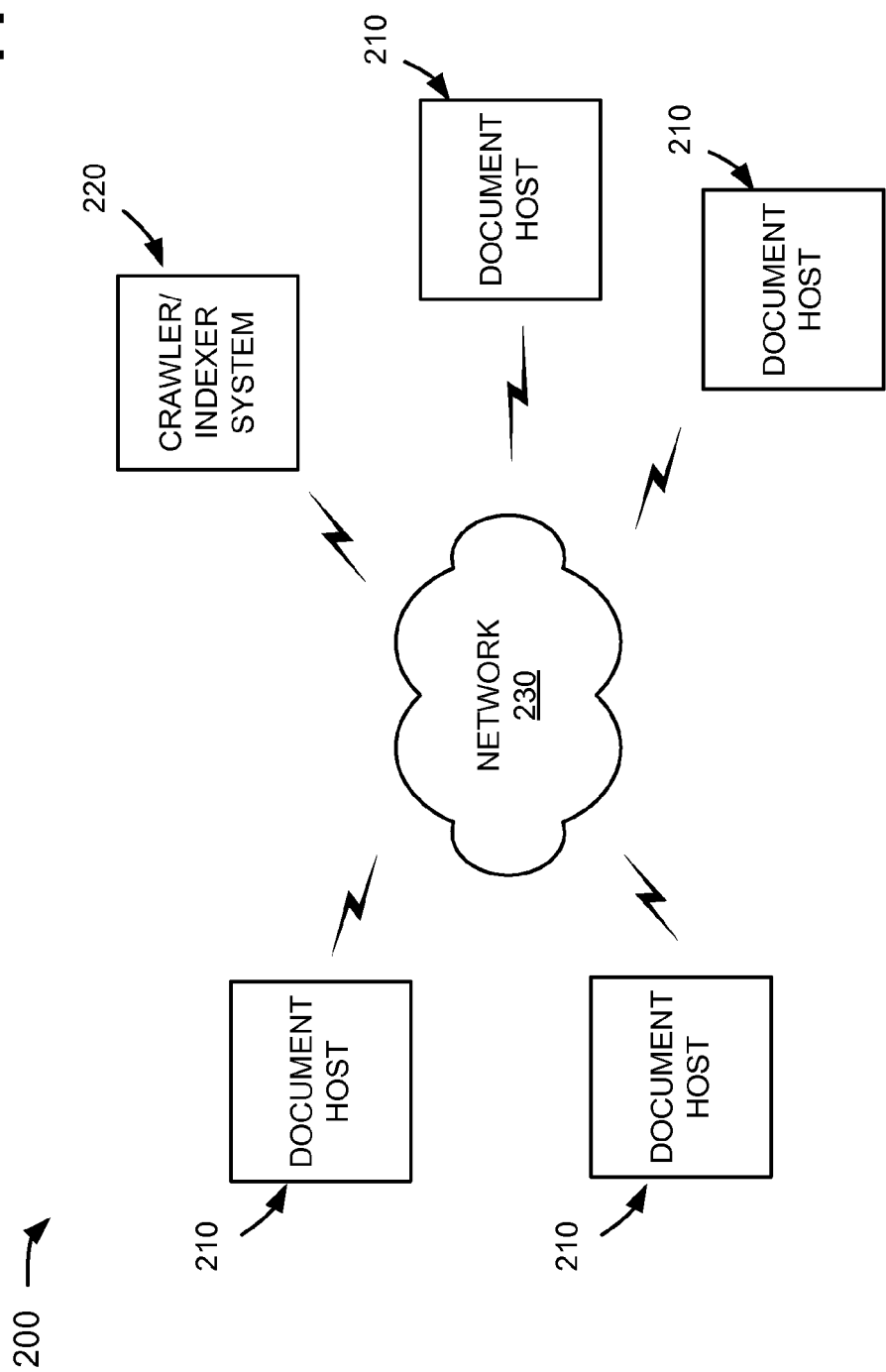
FIG. 2 is a diagram of an exemplary network in which systems and methods described herein may be implemented.

FIG. 2 is a diagram of an exemplary network 200 in which systems and methods described herein may be implemented.

Network 200 may include multiple document hosts 210 connected to a crawler/indexer system 220 via a network 230. Four document hosts 210 and a single crawler/indexer system 220 have been illustrated as connected to network 230 for simplicity. In practice, there may be more, fewer, or a different arrangement of document hosts 210 and/or crawler/indexer systems 220.

Document hosts 210 may include entities that store and/or manage documents. An entity may be defined as a device, such as a stationary or portable computer, a personal digital assistant (PDA), a telephone device, or another type of computation or communication device, a thread or process running on one of these devices, and/or an object executable by one of these devices.

Crawler/indexer system 220 may include an entity that crawls, processes, indexes, and/or maintains documents. For example, crawler/indexer system 220 may crawl a corpus of documents (e.g., web documents), index the documents, and/or store information associated with the documents in a repository of documents. While crawler/indexer system 220 is shown as a single entity, it may be possible for crawler/indexer system 220 to be implemented as two or more separate (and possibly distributed) entities.

Network 230 may include a local area network (LAN), a wide area network (WAN), a telephone network, such as the Public Switched Telephone Network (PSTN) or a cellular network, an intranet, the Internet, or a combination of networks. Document hosts 210 and crawler/indexer system 220 may connect to network 230 via wired and/or wireless connections. The connections may either be direct or indirect connections.

Exemplary Crawler/Indexer System Architecture

Figure 3:
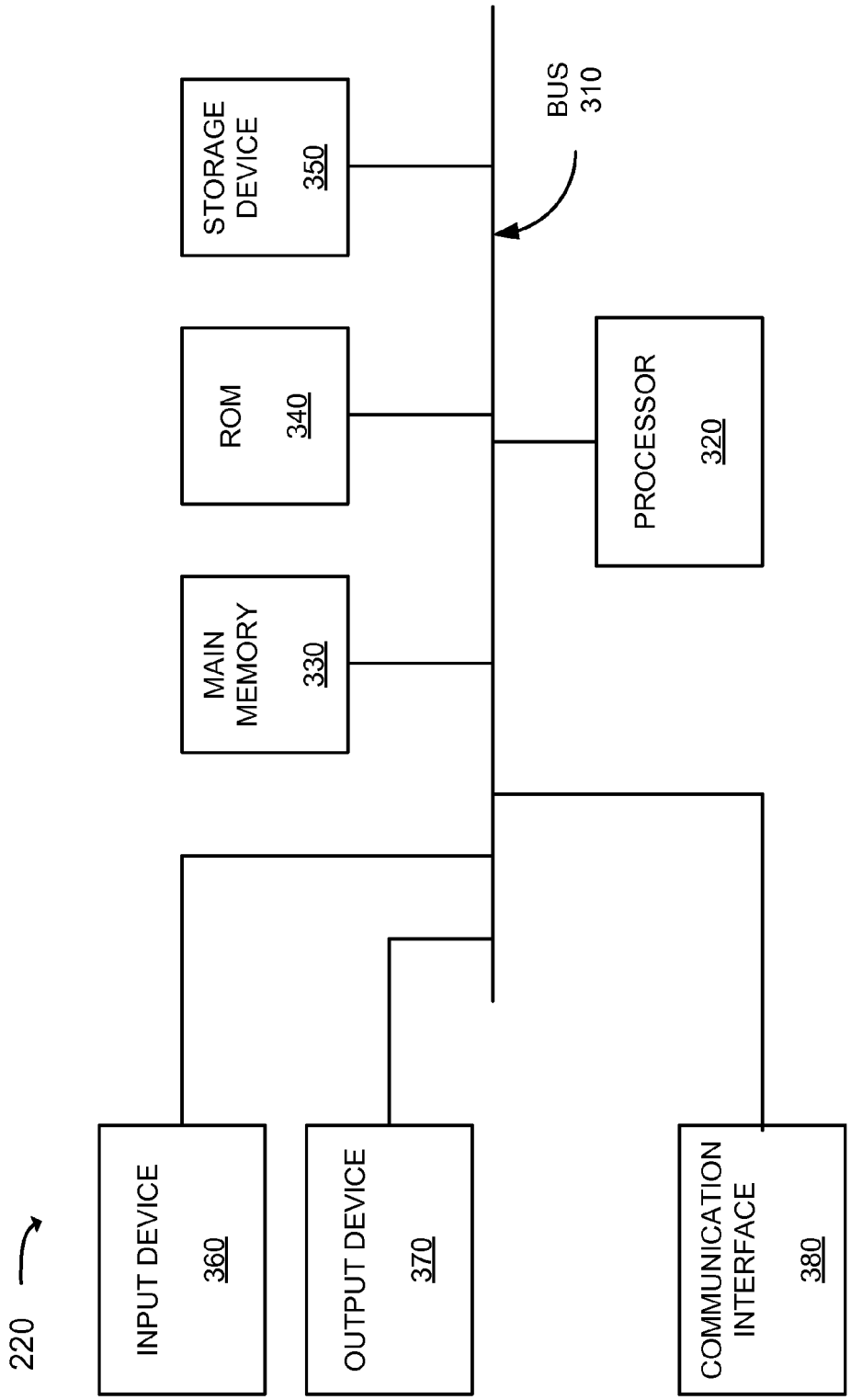
FIG. 3 is a diagram of exemplary components of the crawler/indexer system of FIG. 2.

FIG. 3 is a diagram of exemplary components of crawler/indexer system 220. Crawler/indexer system 220 may include a bus 310, a processor 320, a main memory 330, a read only memory (ROM) 340, a storage device 350, an input device 360, an output device 370, and a communication interface 380. Bus 310 may include a path that permits communication among the components of crawler/indexer system 220.

Processor 320 may include a processor, a microprocessor, or processing logic that may interpret and execute instructions. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive.

Input device 360 may include a component that permits an operator to input information to crawler/indexer system 220, such as a keyboard, a mouse, a pen, voice recognition and/or biometric mechanisms, etc. Output device 370 may include a component that outputs information to the operator, including a display, a printer, a speaker, etc. Communication interface 380 may include any transceiver-like mechanism that enables crawler/indexer system 220 to communicate with other devices and/or systems. For example, communication interface 380 may include components for communicating with another device or system via a network, such as network 230.

Crawler/indexer system 220 may perform certain operations, as will be described in detail below. Crawler/indexer system 220 may perform these operations in response to processor 320 executing software instructions contained in a computer-readable medium, such as memory 330. A computer-readable medium may be defined as a physical or logical memory device.

The software instructions may be read into memory 330 from another computer-readable medium, such as storage device 350, or from another device via communication interface 380. The software instructions contained in memory 330 may cause processor 320 to perform processes that will be described later. Alternatively, hardwired circuitry may be used in place of or in combination with software instructions to implement processes described herein. Thus, implementations described herein are not limited to any specific combination of hardware circuitry and software.

Exemplary Crawler/Indexer System Functional Components

Figure 4:
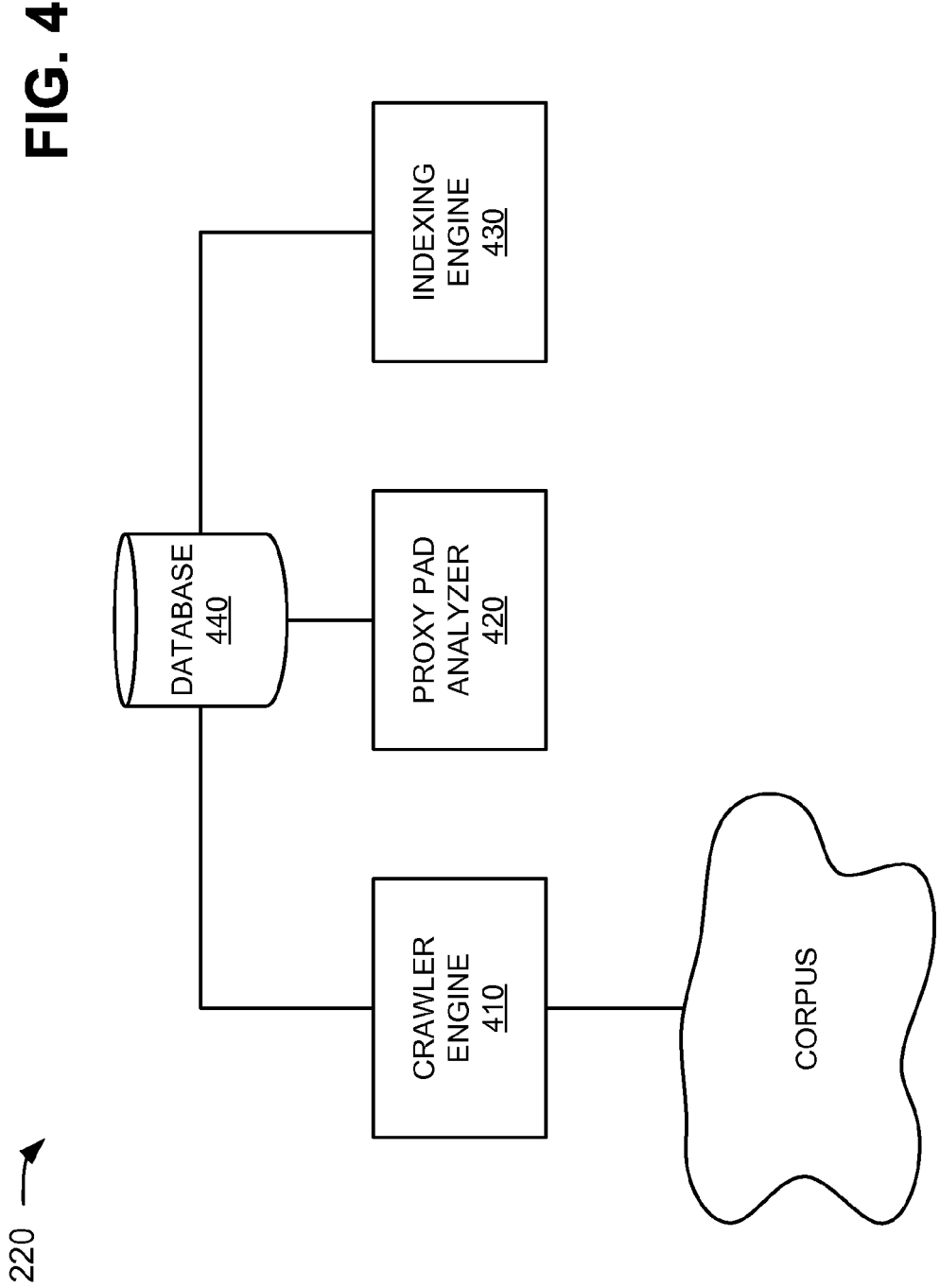
FIG. 4 is a diagram of exemplary functional components of the crawler/indexer system of FIG. 2.

FIG. 4 is a diagram of exemplary functional components of crawler/indexer system 220. Crawler/indexer system 220 may include a crawler engine 410, a proxy pad analyzer 420, and an indexing engine 430 connected to a database 440. In one implementation, crawler engine 410, proxy pad analyzer 420, and/or indexing engine 430 may be implemented by software and/or hardware within crawler/indexer system 220. In another implementation, crawler engine 410, proxy pad analyzer 420, and/or indexing engine 430 may be implemented by software and/or hardware within another device or a group of devices separate from or including crawler/indexer system 220.

Crawler engine 410 may operate from a list of addresses to fetch the corresponding documents from a corpus of documents (e.g., the web). Crawler engine 410 may extract the addresses (e.g., URLs) associated with the outgoing links in the document and add the addresses to the list of addresses to be crawled. Crawler engine 410 may also store information associated with the document, such as all or part of the document, in database 440.

Proxy pad analyzer 420 may analyze documents associated with a web site (or another collection of documents associated with an organization) to determine how likely it is that the web site is a proxy pad. Generally, proxy pad analyzer 420 may determine how likely it is that the web site is a proxy pad based on a comparison involving the documents in the web site and documents that are duplicates of those documents, and based on an aggregation of the comparison information. In one implementation, proxy pad analyzer 420 may generate a proxy pad score that reflects a likelihood that the web site is a proxy pad.

Indexing engine 430 may operate upon documents crawled by crawler engine 410. For example, indexing engine 430 may create an index of the documents and store the index in database 440. Indexing engine 430 may operate upon a cluster of duplicate documents to select one of these documents as representative of the cluster. In one implementation, indexing engine 430 may use the proxy pad score associated with a document in the cluster to influence whether that document is selected as the representative of the cluster. As a result, indexing engine 430 may reduce the chance of indexing a proxy pad document and, thus, may reduce the chance that the proxy pad document will be served as a search result.

Database 440 may be embodied within a single memory device or within multiple (possibly distributed) memory devices. Database 440 may store various information, such as the list of addresses used by crawler engine 410, information associated with documents crawled by crawler engine 410, proxy pad scores determined by proxy pad analyzer 420, and/or the index generated by indexing engine 430.

Exemplary Crawler Engine Functional Components

Figure 5:
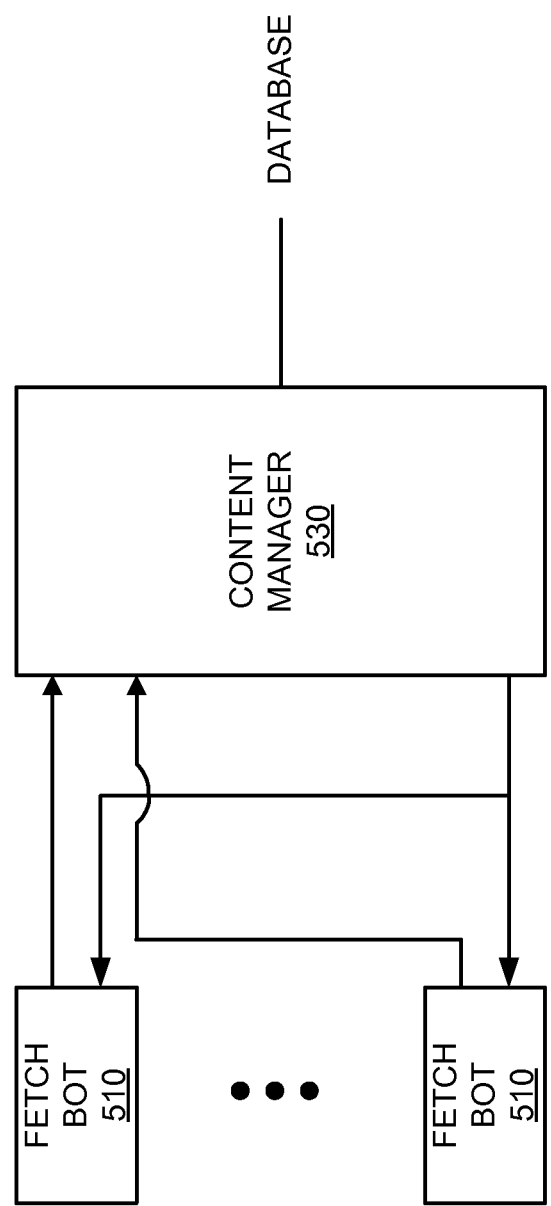
FIG. 5 is a diagram of exemplary functional components of the crawler engine of FIG. 4.

FIG. 5 is a diagram of exemplary functional components of crawler engine 410. In one implementation, crawler engine 410 may be implemented by software and/or hardware within crawler/indexer system 220. In another implementation, crawler engine 410 may be implemented by software and/or hardware within another device or a group of devices separate from or including crawler/indexer system 220.

Crawler engine 410 may include fetch bots 510 and content manager 530. A fetch bot 510 may fetch a document from a corpus of documents and provide the fetched document to content manager 530. Fetch bots 510 may operate from a list of addresses provided by content manager 530.

Content manager 530 may parse a document fetched by a fetch bot 510 to identify the outgoing links that the fetched document contains. Content manager 530 may add addresses associated with the outgoing links to a list of addresses that it maintains. Content manager 530 may provide addresses from the list to fetch bots 510 as instructions for fetch bots 510 to fetch (i.e., crawl) the corresponding documents. Content manager 530 may also store information associated with the fetched documents (e.g., all or part of the fetched documents) in database 440 (FIG. 4).

Exemplary Proxy Pad Analyzer Functional Components

Figure 6:
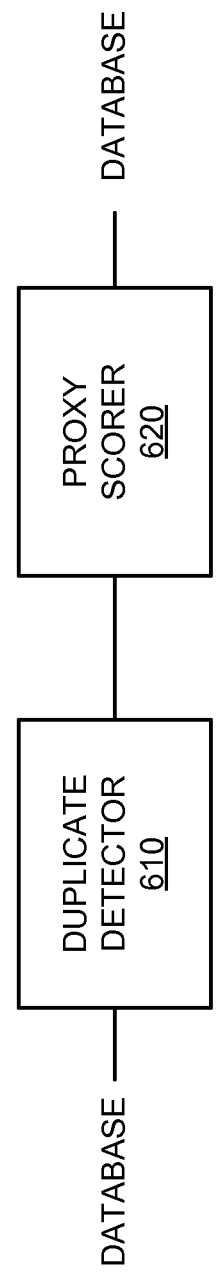
FIG. 6 is a diagram of exemplary functional components of the proxy pad analyzer of FIG. 4.

FIG. 6 is a diagram of exemplary functional components of proxy pad analyzer 420. In one implementation, proxy pad analyzer 420 may be implemented by software and/or hardware within crawler/indexer system 220. In another implementation, proxy pad analyzer 420 may be implemented by software and/or hardware within another device or a group of devices separate from or including crawler/indexer system 220.

Proxy pad analyzer 420 may include a duplicate detector 610 and a proxy scorer 620. Duplicate detector 610 may use one or more of a number of techniques to determine whether two documents are duplicates (including substantial duplicates) of each other. The techniques may generally fall into the categories of content-based clustering and predictive clustering. Content-based clustering may require an analysis of the contents of the documents to identify duplicates. Predictive clustering may identify duplicate documents without analyzing the contents of the documents.

An example of a content-based clustering technique may involve duplicate detector 610 computing a checksum or hash over the content, or a portion of the content, of a document. Two documents with the same checksum or hash may be considered duplicates of each other. Another example of a content-based clustering technique may involve analyzing redirects. If a source document redirects to a target document, then the source and target documents may be considered duplicates of each other.

An example of a predictive clustering technique may involve computing checksums or hashes over documents of a web site, a directory or subdirectory, or a combination of address parameters, and generating a set of rules that given an address, predicts a cluster identifier (ID) for the document associated with that address. A separate set of rules may be generated for each web site, directory, subdirectory, or address parameter combination. Some of these rules may list address prefixes that are equivalents of each other. For example, these rules might specify that www.mysite.com, mysite.com, www.geocities.com/mysite, and geocities.com/mysite are equivalents of each other. Thus, each of these addresses may map to the same cluster ID. Some other rules may identify address parameters that are irrelevant. For example, these rules might specify that given the address www.forum.com/posts, a post identifier (postid) parameter matters, but a session identifier (sid) parameter does not matter. Thus, these rules might identify the addresses www-.forum.com/posts/postid=108/sid=162 and www.forum-.com/posts/postid=108/sid=867 as equivalents of each other. Thus, each of these addresses may map to the same cluster ID.

Duplicate detector 610 may place each crawled document into a cluster. The cluster may have a single document or thousands or millions of documents. If duplicate detector 610 determines that two documents are duplicates of each other, then duplicate detector 610 may place the two documents in the same cluster. Duplicate detector 610 may record information regarding the cluster to which a document belongs in, for example, database 440.

Proxy scorer 620 may analyze a set of documents associated with an organization, such as a web site. An organization might have millions of associated documents. For each of the documents, proxy scorer 620 may identify the cluster in which the document was placed. Proxy scorer 620 may then analyze each of the clusters. For each cluster, proxy scorer 620 may determine a measure of quality (e.g., as a quality score) for each of the documents. In one implementation, a documents quality score may include the document's link-based score. In another implementation, a document's quality score may include other information, such as the date on which the document was created, an indication or prediction of whether the document is spam, etc. It may be possible for a cluster to include multiple documents associated with the same organization. In this situation, proxy scorer 620 may group the documents together and assign the group the highest quality score of the documents in the group.

Proxy scorer 620 may declare a "winner" for each of the clusters based on the quality scores of the documents in the cluster. The winner may be the organization associated with the document that has the highest quality score of the documents in the cluster. Proxy scorer 620 may declare all of the other organizations associated with documents in the cluster as "losers." For a cluster that includes only one document or multiple documents associated with the same organization (or multiple documents from multiple organizations that all have the same quality score), proxy scorer 620 may declare the organization associated with the document(s) as "trivial."

Proxy scorer 620 may add up the quality scores for the documents associated with the organization in the different categories of winner, loser, and trivial. For the winners, proxy scorer 620 may add up the quality scores of the documents to generate a total winner score. For the losers, proxy scorer 620 may determine the differences between the quality scores of the losers and the quality scores of the corresponding winners in the losers' clusters, and add up these differences to generate a total loser score. In other words, for each cluster in which the organization had a loser, proxy scorer 620 may identify the difference in quality score between the winner and the loser (associated with the organization). For the trivials, proxy scorer 620 may add up the quality scores of the documents to generate a total trivial score. Proxy scorer 620 may compute a proxy pad score by combining the total winner score, the total loser score, and the total trivial score.

Proxy scorer 620 may also identify the number of other organizations to which documents of the organization lost, as a spam signal. If the organization lost to just a few other organizations, then it might not be a strong sign of spam. For example, this may happen if the organization is moving its documents from one domain to another. If the organization lost to many different organizations, then this might be a strong sign of spam. For example, this may occur if an organization has many documents that copy content from other organizations. Proxy server 620 may use the spam signal to adjust the proxy pad score. In one implementation, proxy server 620 may use the spam signal to adjust the influence the total loser score has in computing the proxy pad score. For example, the proxy server 620 may use the spam signal to generate a multiplication factor. Proxy server 620 may multiply the total loser score by the multiplication factor prior to using the total loser score to compute the proxy pad score.

Proxy scorer 620 may repeat these functions to compute proxy pad scores for other organizations until documents associated with an entire set of organizations have been analyzed. Proxy scorer 620 may store the proxy pad scores in association with the organizations in, for example, database 440.

Exemplary Indexing Engine Functional Components

Figure 7:
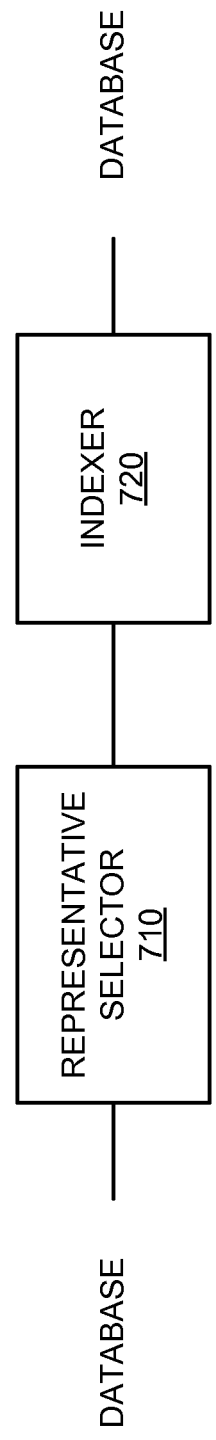
FIG. 7 is a diagram of exemplary functional components of the indexing engine of FIG. 4.

FIG. 7 is a diagram of exemplary functional components of indexing engine 430. In one implementation, indexing engine 430 may be implemented by software and/or hardware within crawler/indexer system 220. In another implementation, indexing engine 430 may be implemented by software and/or hardware within another device or a group of devices separate from or including crawler/indexer system 220.

Indexing engine 430 may include representative selector 710 and indexer 720. Representative selector 710 may operate upon each cluster in a set of clusters to select a representative document. For example, representative selector 710 may rank the documents in a cluster in some manner to create a ranked list. In one implementation, representative selector 710 may use information that reflects a measure of quality of the documents to rank the documents within the ranked list. In one implementation, this measure of quality may include the document's link-based score.

Representative selector 710 may adjust a document's measure of quality based on the proxy pad score that was determined by proxy pad analyzer 420 for the organization with which the document is associated. For example, representative selector 710 may reduce the document's measure of quality by a factor that depends on the value of the proxy pad score. In one implementation, the factor may be a division factor that may range from a value of one to a value of two. In another implementation, the division factor may include a different range of values. This may serve to move a document that is associated with a proxy pad to a lower position in the ranked list.

Indexer 720 may index one or more top-ranked documents from each of the ranked lists. For example, indexer 720 may take the text or other data of a top-ranked document in a ranked list, extract individual terms or other data from the text of the document, and sort those terms or other data (e.g., alphabetically) in an index. Other techniques for extracting and indexing content, that are more complex than simple word-level indexing, may also or alternatively be used, including techniques for indexing XML data, images, videos, etc. Each entry in the index may contain a term or other data stored in association with a list of documents in which the term or other data appears and the location within the document where the term or other data appears.

Exemplary Process for Computing a Proxy Pad Score

Figure 8:
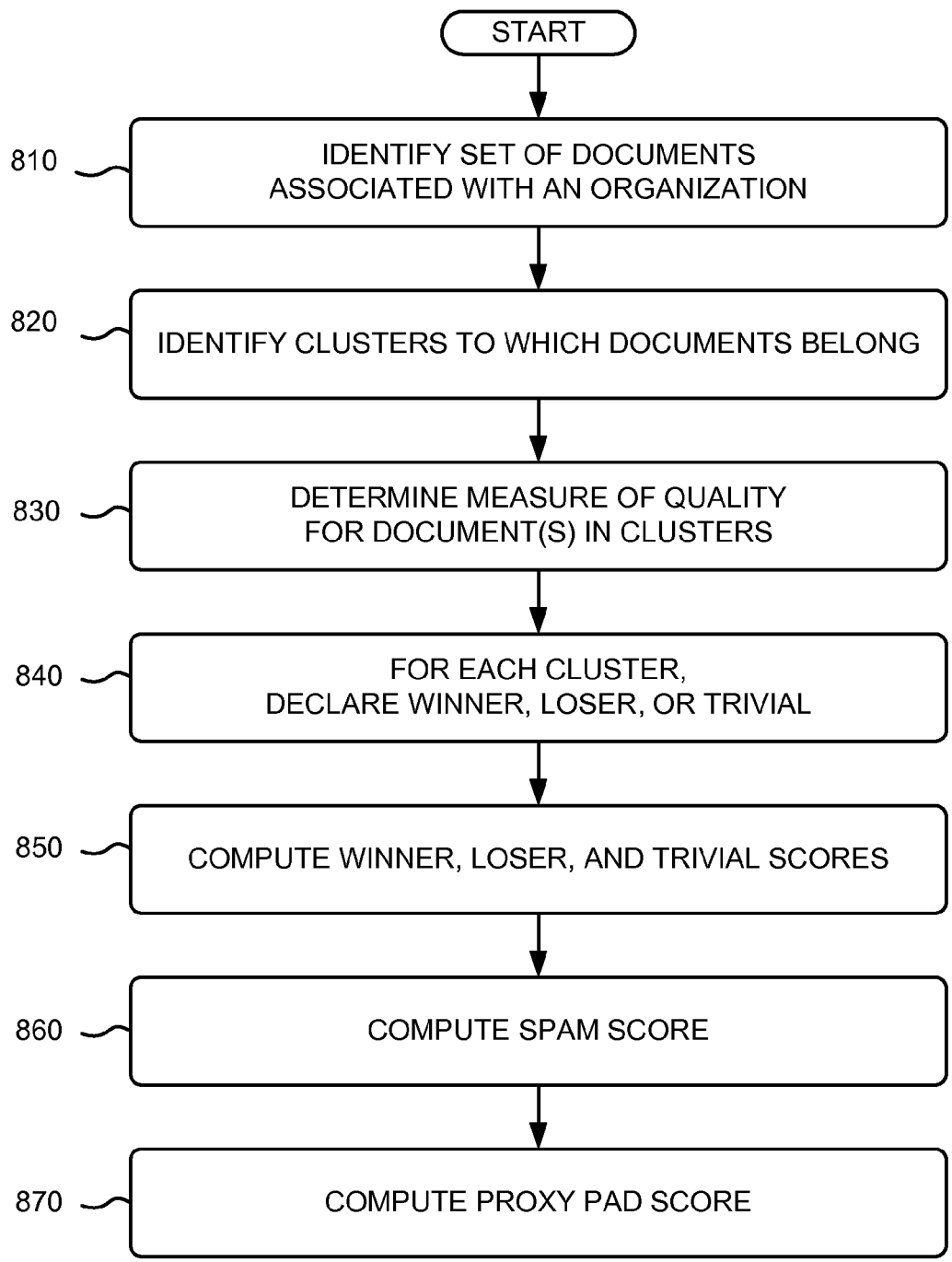
FIG. 8 is a flowchart illustrating an exemplary process for computing a proxy pad score.

FIG. 8 is a flowchart illustrating an exemplary process for computing a proxy pad score. In one implementation, the exemplary process of FIG. 8 may be performed by proxy pad analyzer 420. In another implementation, the exemplary process of FIG. 8 may be performed by one or more other components, possibly in conjunction with proxy pad analyzer 420.

As shown in FIG. 8, the process may begin with a set of documents that are associated with an organization being identified (block 810). For example, proxy pad analyzer 420 may identify a set of documents associated with a web site or some other collection of documents that are associated with a same organization. In one implementation, these documents may include documents that have been crawled by crawler engine 410. Several techniques exist for identifying an organization with which a document is associated.

The clusters to which the documents belong may be identified (block 820). In one implementation, proxy pad analyzer 420 may use cluster information that has been previously determined or recorded to identify the appropriate cluster for a document. In this case, proxy pad analyzer 420 may simply look up the cluster information. In an alternative implementation, proxy pad analyzer 420 may use a content-based clustering or predictive clustering technique to determine the cluster to which a document belongs.

Figure 9:
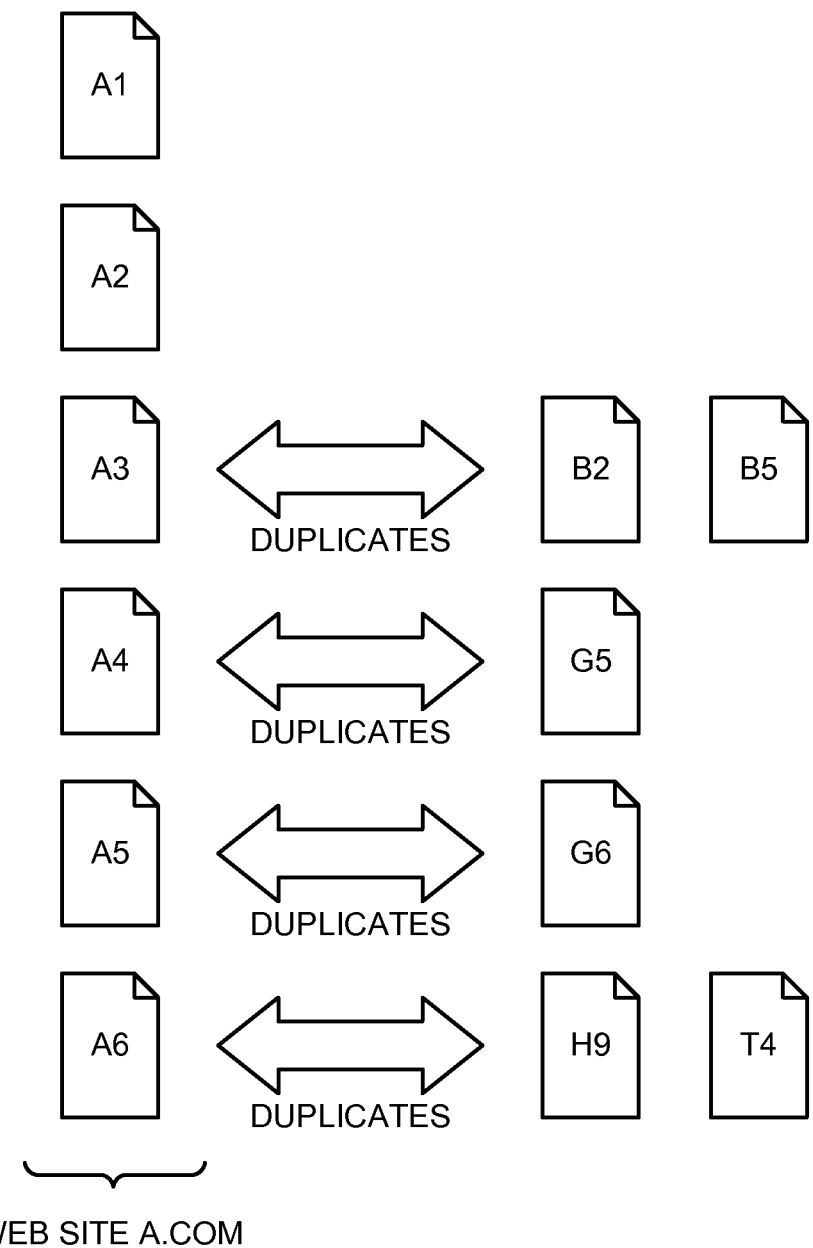
FIG. 9 is a diagram of documents associated with an exemplary web site.

Consider an exemplary web site associated with an organization. FIG. 9 is a diagram of documents associated with the exemplary web site. As illustrated, a web site (A.com) has six associated documents (A.com/A1, A.com/A2, . . . , A.com/A6). Documents A.com/A1 and A.com/A2 serve unique content and, thus, are in clusters by themselves. Document A.com/A3 is a duplicate of and in a cluster with document B.com/B2 and document B.com/B5. Document A.com/A4 is a duplicate of and in a cluster with document G.com/G5. Document A.com/A5 is a duplicate of and in a cluster with document G.com/G6. Document A.com/A6 is a duplicate of and in a cluster with document H.com/H9 and document T.com/T4.

Returning to FIG. 8, a measure of quality may be determined for document(s) in each of the clusters (block 830). In one implementation, a measure of quality (also referred to herein as a "quality score") for a document may be previously determined and associated with the document. In this case, proxy pad analyzer 420 may determine the quality score for a document by looking up the quality score in a memory. If a cluster includes multiple documents associated with the same organization, proxy pad analyzer 420 may assign the multiple documents the highest quality score among the multiple documents.

Figure 10:
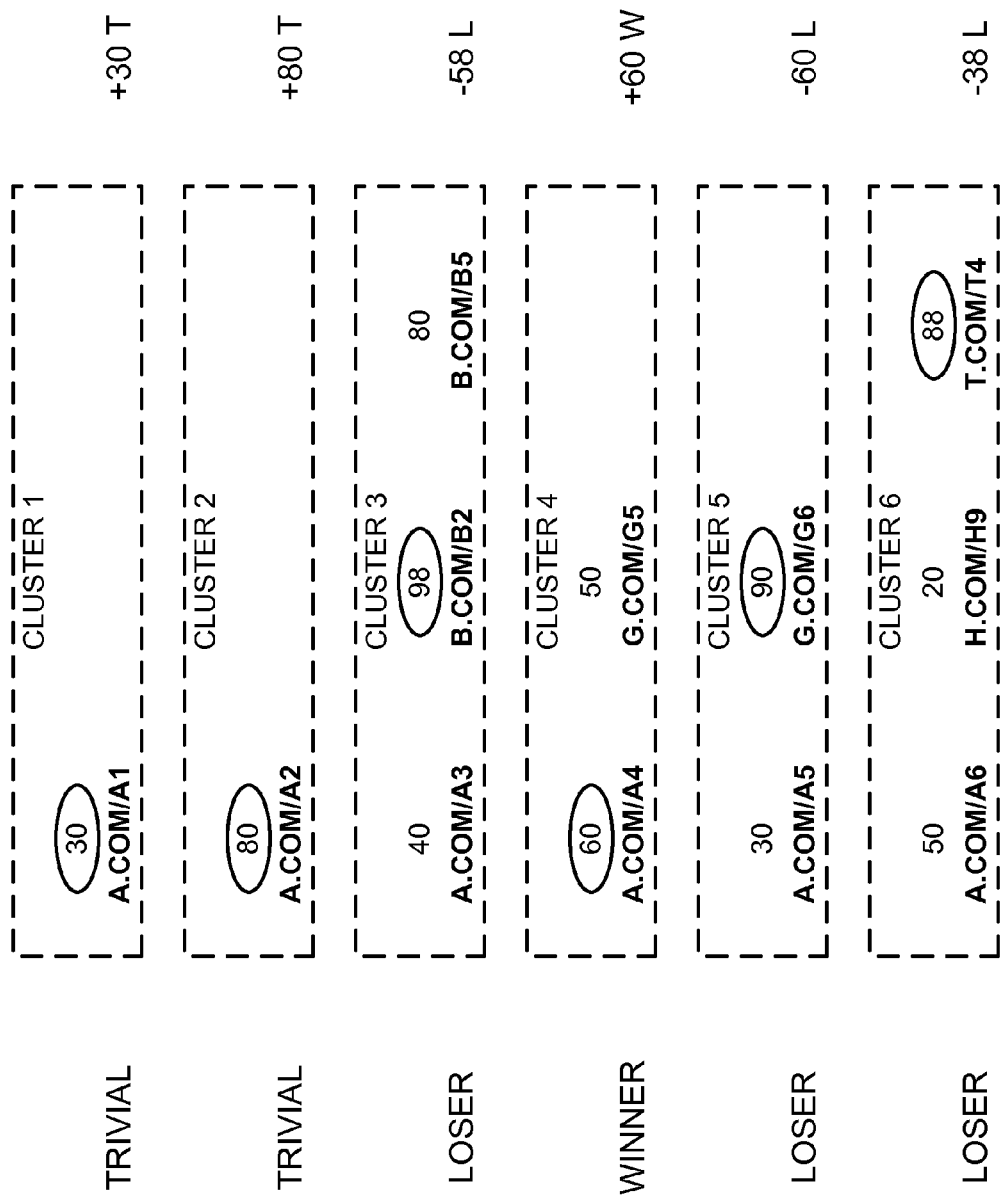
FIG. 10 is a diagram of illustrating information that may be used to calculate a proxy pad score.

As shown in FIG. 10, assume that document A.com/A1 in cluster 1 has a quality score of 30; document A.com/A2 in cluster 2 has a quality score of 80; document A.com/A3 in cluster 3 has a quality score of 40; document B.com/B2 in cluster 3 has a quality score of 98; document B.com/B5 in cluster 3 has a quality score of 80; document A.com/A4 in cluster 4 has a quality score of 60; document G.com/G5 in cluster 4 has a quality score of 50; document A.com/A5 in cluster 5 has a quality score of 30; document G.com/G6 in cluster 5 has a quality score of 90; document A.com/A6 in cluster 6 has a quality score of 50; document H.com/H9 in cluster 6 has a quality score of 20; and document T.com/T4 in cluster 6 has a quality score of 88.

As further shown in FIG. 8, a winner, loser, or trivial may be declared for each cluster (block 840). For example, proxy pad analyzer 420 may analyze the quality scores for each cluster and determine whether the document for the organization (i.e., A.com) is a winner, a loser, or a trivial. As explained above, a winner may be the organization associated with the document that has the highest quality score of the documents in the cluster. A loser may be any organization associated with a document that is not declared the winner for the cluster. A trivial may be the organization associated with a document in a cluster that contains only one or more documents associated with the organization.

As shown in FIG. 10, web site A.com may be a trivial for cluster 1 because document A.com/A1 is the sole document in the cluster; web site A.com may be a trivial for cluster 2 because document A.com/A2 is the sole document in the cluster; web site A.com may be a loser for cluster 3 because document A.com/A3 has a quality score of 40 that is lower than the quality score of 98 for document B.com/B2; web site A.com may be a winner for cluster 4 because document A.com/A4 has a quality score of 60 that is higher than the quality score of 50 for document G.com/G5; web site A.com may be a loser for cluster 5 because document A.com/A5 has a quality score of 30 that is lower than the quality score of 90 for document G.com/G6; and web site A.com may be a loser for cluster 6 because document A.com/A6 has a quality score of 50 that is lower than the quality score of 88 for document T.com/T4.

Returning to FIG. 8, winner, loser, and trivial scores may be computed (block 850). For example, proxy pad analyzer 420 may identify a winner score for each cluster for which the organization was a winner, a loser score for each cluster for which the organization was a loser, and a trivial score for each cluster for which the organization was a trivial.

The winner score for a cluster may be equal to the quality score of the winning document in that cluster. As shown in FIG. 10, proxy pad analyzer 420 may determine a winner score of +60 for cluster 4 since the organization's document in cluster 4, with a quality score of 60, won the cluster. The loser score for a cluster may be equal to the difference in quality scores of a losing document and a winning document in that cluster. As shown in FIG. 10, proxy pad analyzer 420 may determine a loser score of −58 for cluster 3 since the organization's document in cluster 3, with a quality score of 40, lost to a document with a quality score of 98. The loser score for cluster 3 is the difference between the organization's loser score of 40 and the winner's score of 98. As further shown in FIG. 10, proxy pad analyzer 420 may determine a loser score of −60 for cluster 5 since the organization's document in cluster 5, with a quality score of 30, lost to a document with a quality score of 90. The loser score for cluster 5 is the difference between the organization's loser score of 30 and the winner's score of 90. As further shown in FIG. 10, proxy pad analyzer 420 may determine a loser score of −38 for cluster 6 since the organization's document in cluster 6, with a quality score of 50, lost to a document with a quality score of 88. The loser score for cluster 6 is the difference between the organization's loser score of 50 and the winner's score of 88. A trivial score for a cluster may be equal to the quality score of the trivial document in that cluster. As shown in FIG. 10, proxy pad analyzer 420 may determine a trivial score of +30 for cluster 1 since the sole document in cluster 1 has a quality score of 30. As further shown in FIG. 10, proxy pad analyzer 420 may determine a trivial score of +80 for cluster 2 since the sole document in cluster 2 has a quality score of 80.

Proxy pad analyzer 420 may add up the trivial scores, winner scores, and loser scores. In one implementation, proxy pad analyzer 420 may generate a table for the organization that identifies the number of the organization's documents that were declared trivials, winners, and losers. For the trivials, proxy pad analyzer 420 may generate a total trivial score by adding up the trivial scores. For the winners, proxy pad analyzer 420 may generate a total winner score by adding up the winner scores. For the losers, proxy pad analyzer 420 may generate a total loser score by adding up the loser scores.

As shown in FIG. 11A, a table for organization A.com may include three entries: an entry for trivial, an entry for winner, and an entry for loser. Each of the entries may include a number of fields, such as a field that identifies the entry as a trivial, winner, or loser entry, a field that identifies the number of documents that were declared a trivial (if the entry is a trivial entry), a winner (if the entry is a winner entry), or a loser (if the entry is a loser entry), and a field that provides the total trivial score (if the entry is a trivial entry), the total winner score (if the entry is a winner entry), or the total loser score (if the entry is a loser entry). As shown in FIG. 11A, the trivial entry indicates that organization A.com includes two documents that were declared trivials and the total trivial score is +110 (i.e., (+30)+(+80)=+110); the winner entry indicates that organization A.com includes a single document that was declared a winner and the total winner score is +60; and the loser entry indicates that organization A.com includes three documents that were declared losers and the total loser score is −156 (i.e., (−58)+(−60)+(−38)=−156).

Returning to FIG. 8, a spam score may be computed (block 860). For example, proxy pad analyzer 420 may identify, for each cluster where the organization was declared a loser, the organization that was declared the winner for that cluster. Proxy pad analyzer 420 may then add up the number of losses to each of these organizations. As shown in FIG. 10, proxy pad analyzer 420 may identify organization B.com as the winner for cluster 3, organization G.com as the winner for cluster 5, and organization T.com as the winner for cluster 6. In one implementation, proxy pad analyzer 420 may generate a table for the organization that identifies the other organizations to which the organization lost and the number of times that the organization lost to these other organizations.

As shown in FIG. 11B, a table for organization A.com may include a number of entries. Each of the entries may include a number of fields, such as a field that identifies another organization to which the organization lost, and a field that identifies the number of times that the organization lost to this other organization. As shown in FIG. 11B, organization A.com lost to organization B.com one time, organization G.com one time, and organization T one time.

Consider a more complicated example, as shown in FIG. 11C. Assume that organization A.com lost to organization B.com ten thousand times, to organization C.com eight thousand times, to organization D.com seven thousand times, to organization E.com six thousand times, to organization F.com three thousand times, to organization G.com one thousand times, to organization H.com four hundred times, to organization I.com seventy-five times, and so on to organization Y.com one time.

Proxy pad analyzer 420 may rank the organizations by the number of times that the organization lost to these other organizations. Proxy pad analyzer 420 may identify a particular number of the top-ranking organizations (e.g., 3) as the "head" and the remaining organizations as the "tail." Proxy pad analyzer 420 may then add up the numbers in the head, as a head number, and separately add up the numbers in the tail, as a tail number. As shown in FIG. 11C, the head number may equal 25,000 and the tail number may equal 18,500.

Proxy pad analyzer 420 may compute a ratio of the tail number to the head number, as a spam score. As shown in FIG. 11C, the spam score may be equal to, or derived from, 18,500/25,000. If organization A.com loses to a few different organizations, it might not be a sign of spam. If, however, organization A.com loses to a lot of different organizations, then this might be a strong sign of spam. In one implementation, the spam score may be normalized to a particular range, such as a range of 0-100 or 0-1000. The higher the normalized spam score, the more likely that organization A.com is a spam organization.

Proxy pad analyzer 420 may use the spam score to determine a factor for increasing the total loser score. For example, proxy pad analyzer 420 may determine a multiplication factor that may range from one (e.g., for spam scores less than a threshold value) to three (e.g., for spam scores equal to or greater than the threshold value that indicate that the organization is very likely to be spam). In another implementation, the range for the multiplication factor may be different.

As further shown in FIG. 8, a proxy pad score may be computed (block 870). For example, proxy pad analyzer 420 may combine the total trivial score, the total winner score, and the total loser score in some manner to compute the proxy pad score. A formula for computing the proxy pad score (PPS) may generally be represented as:

$$PPS=T+W+L,$$

where T refers to the total trivial score, W refers to the total winner score, and L refers to the total loser score. Using the information from FIG. 11A, proxy pad analyzer 420 may compute the proxy pad score as:

$$PPS=(+110)+(+60)+(-156)=+14.$$

In another implementation, one or more of these total scores may be weighted or modified when computing the proxy pad score. For example, the total trivial score may be weighted to demote the total trivial score by some fraction XX (e.g., by 2, by 3, etc.). One reason to demote the trivial score is that a technique sometimes used by spammers is to include hundreds or thousands of documents serving unique content with other documents that copy content from other organizations in an attempt to fool the indexer into believing that its documents are legitimate. Also, the total loser score may be increased by a multiplication factor YY determined based on the spam score, as described above. In this implementation, a formula for computing the proxy pad score may be represented as:

$$PPS=T/XX+W+L*YY.$$

Assume that XX is a value of 2 and YY is a value of 2. Using the information from FIG. 11A, proxy pad analyzer 420 may compute the proxy pad score as:

$$PPS=(+110/2)+(+60)+(-156*2)=(+55)+(+60)+(-312)$$
$$=-197.$$

It is possible, using one of the formulas identified above, for an organization with a lot of documents to be treated different from an organization with many fewer documents. As a result, according to one implementation, proxy pad analyzer 420 may subject the proxy pad score to a logarithmic operation, which may be represented by:

$$\log\_score=\ln(|proxy\ pad\ score|).$$

As a result, as the number of documents increases, the proxy pad score may increase on a logarithmic scale.

Proxy pad analyzer 420 may also normalize the log_score (or the proxy pad score if the proxy pad score was not subjected to a logarithm operation) to generate a final proxy pad score. For example, proxy pad analyzer 420 may map the log_score to a particular range, such as 0-100 or 0-1000. In one implementation, proxy pad analyzer 420 may map the log_score to different portions of the range based on whether the proxy pad score was negative or positive. For a range of 0-1000 and a positive proxy pad score, for example, proxy pad analyzer 420 may map the log_score to a value between 0 and 500, where higher log_score values map closer to a value of 0. For a range of 0-1000 and a negative proxy pad score, for example, proxy pad analyzer 420 may map the log_score to a value between 500 and 1000, where higher log_score values map closer to a value of 1000. As a result, values near 1000 may indicate that the organization is very likely to be a proxy pad site, and values near 0 may indicate that the organization is very unlikely to be a proxy pad site.

Proxy pad analyzer 420 may repeat the above process blocks of FIG. 8 for other organizations and record the final proxy pad scores in association with the organizations in a memory, such as database 440.

Exemplary Process for Selecting Duplicate Document to Index

Figure 12:
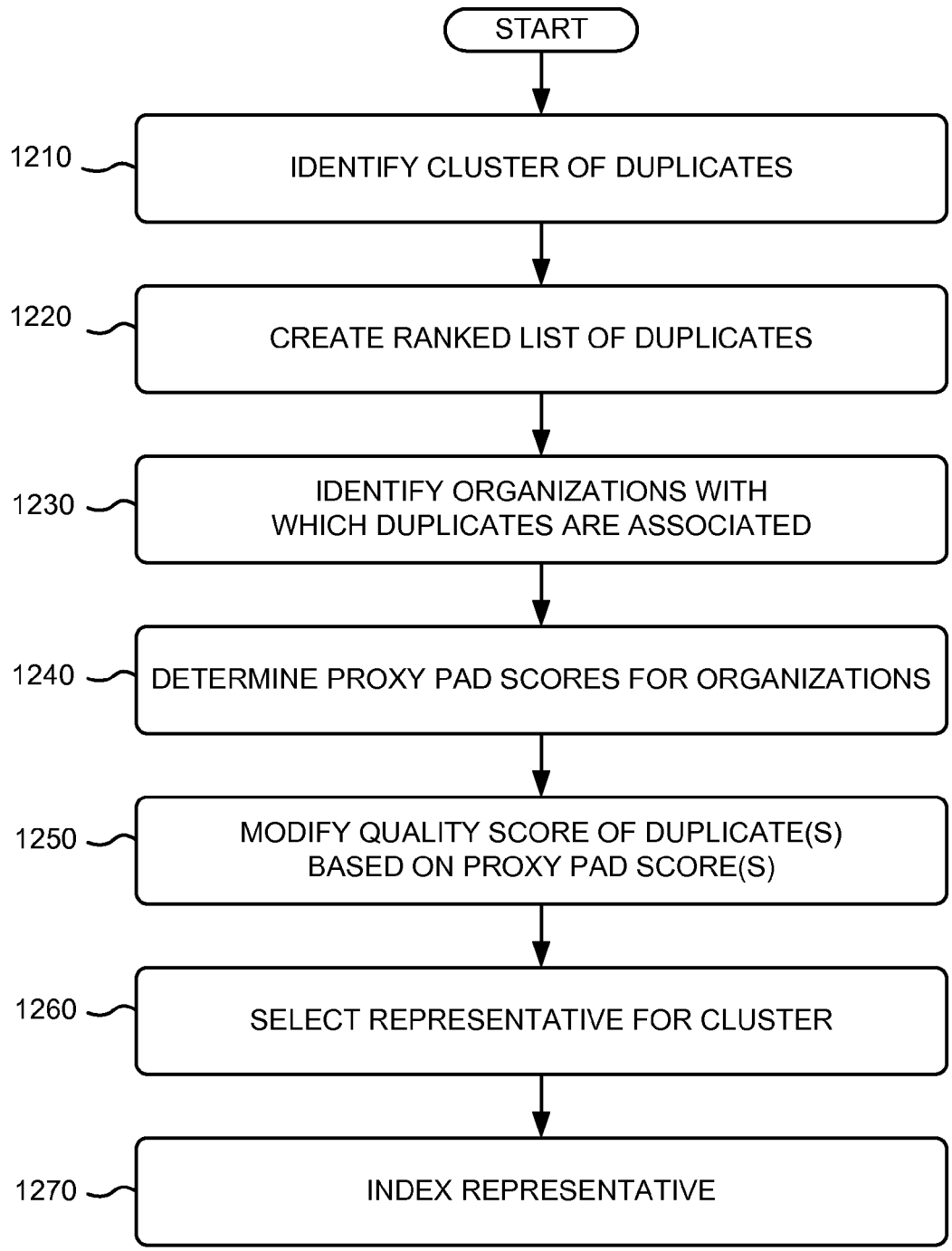
FIG. 12 is a flowchart illustrating an exemplary process for selecting a duplicate document to index.

FIG. 12 is a flowchart illustrating an exemplary process for selecting a duplicate document to index. In one implementation, the exemplary process of FIG. 12 may be performed by indexing engine 430. In another implementation, the exemplary process of FIG. 12 may be performed by one or more other components, possibly in conjunction with indexing engine 430.

As shown in FIG. 12, the process may begin with a cluster of duplicates being identified (block 1210). As explained above, indexing engine 430 may use one or more of a number of techniques to cluster sets of duplicate documents. Indexing engine 430 may select one of these clusters upon which to operate.

A ranked list of duplicates in the cluster may be created (block 1220). For example, as explained above, indexing engine 430 may rank the documents in the cluster in some manner to create a ranked list. In one implementation, indexing engine 430 may use information regarding the quality of a document (e.g., a measure of quality, such as a link-based score, which may be referred to as a "quality score") to rank the document within the ranked list.

The organizations with which the duplicates are associated may be determined (block 1230). For example, indexing engine 430 may use one or more of several known techniques to identify an organization with which a document is associated.

Proxy pad scores associated with the organizations may be determined (block 1240). As described above, proxy pad analyzer 420 may compute proxy pad scores for a group of organizations. Indexing engine 430 may receive or otherwise obtain these proxy pad scores. For example, indexing engine 430 may perform a look-up operation of the proxy pad score for a particular organization in a memory, such as database 440.

The quality score of one or more of the duplicates within the ranked list may be modified based on the duplicate's proxy pad score (block 1250). For example, indexing engine 430 may reduce a duplicate's quality score based on the duplicate's proxy pad score. In one implementation, indexing engine 430 may map a proxy pad score into a factor used to reduce a duplicate's quality score. The factor may include a division factor that ranges from one to two. With a division factor of one, the proxy pad score may remain unchanged (i.e., dividing the proxy pad score by one would not change the proxy pad score). With a division factor of two, the proxy pad score may be divided in half.

In one implementation, indexing engine 430 may map any proxy pad score less than a threshold to a division factor of one. The threshold selected may vary. In one implementation, the threshold may be set at 70% of the proxy pad range. For example, as described above, the proxy pad scores may be normalized to a range (e.g., 0-1000, 0-100, etc.). For a 0-1000 range, for example, the threshold may be set to 70% of this range, or 700. In this case, indexing engine 430 may map any proxy pad score less than 700 to a division factor of one. Indexing engine 430 may map proxy pad scores equal to or greater than the threshold (e.g., 70% or 700 for the 0-1000 range) to values on an incremental scale greater than one and less than or equal to two. For example, a proxy pad score of 710 may map to a division factor approximately equal to one, and a proxy pad score of 990 may map to a division factor approximately equal to two.

In another implementation, indexing engine 430 may reduce a duplicate's quality score in another way. For example, instead of dividing a duplicate's quality score by a division factor, indexing engine 430 may demote a duplicate's position in the ranked list by zero or more spots based on the value of its proxy pad score.

Figure 13A:
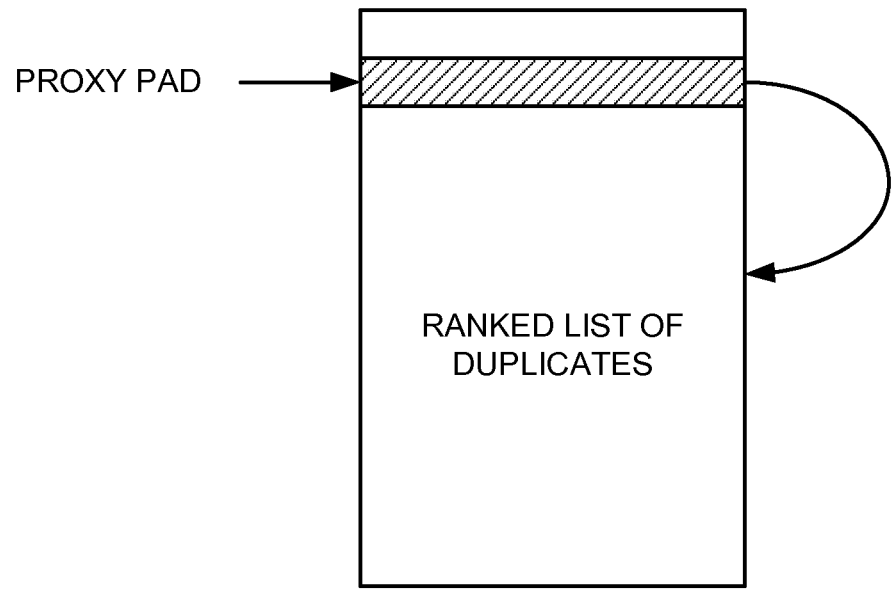
FIGS. 13A and 13B are diagrams illustrating how a proxy pad is processed when selecting a duplicate document to index.
Figure 13B:
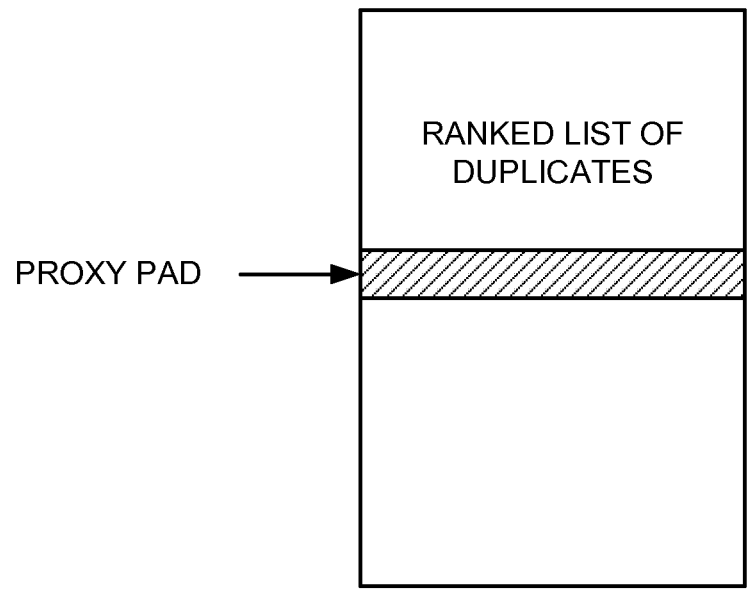

As described above, indexing engine 430 may reduce a duplicate's quality score based on the duplicate's proxy pad score. As shown in FIGS. 13A and 13B, this may result in moving a position of the duplicate toward the bottom of the ranked list. Although, this is not necessarily the case. For example, a duplicate may have its quality score reduced by some division factor and remain at the same position within the ranked list. This may occur when the duplicate's quality score is much higher than the quality score of the next-highest ranked duplicate so that the duplicate's quality score remains higher than the quality score of the next-highest ranked duplicate even after reducing the duplicate's quality score.

Returning to FIG. 12, a representative for the cluster may be selected (block 1260). For example, indexing engine 430 may select one duplicate, or a set of duplicates, as the representative (sometimes called the "canonical") for the cluster. In one implementation, indexing engine 430 may select the highest ranking duplicate in the ranked list as the representative for the cluster.

The representative may be indexed (block 1270). For example, indexing engine 430 may take the text or other data of the representative document, extract individual terms or other data from the text of the representative document, and sort those terms or other data (e.g., alphabetically) in an index. Other techniques for extracting and indexing content, that are more complex than simple word-level indexing, may also or alternatively be used, including techniques for indexing XML data, images, videos, etc. Each entry in the index may contain a term or other data stored in association with a list of documents in which the term or other data appears and the location within the document where the term or other data appears. Based on the above processes, indexing engine 430 may ensure that spam sites are rarely, if ever, served as search results.

CONCLUSION

Implementations described herein may identify the likelihood that a site is a proxy pad and take measures to ensure that proxy pads are not indexed and, thus, not served to users as search results.

The foregoing description provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 8 and 12, the order of the blocks may be modified in other implementations. Further, non-dependent blocks may be performed in parallel.

As used herein, the term "component," is intended to be broadly interpreted to refer to hardware, software, or a combination of hardware and software.

It will be apparent that systems and methods, as described above, may be implemented in many different forms of software, firmware, and hardware in the implementations illustrated in the figures. The actual software code or specialized control hardware used to implement these systems and methods is not limiting of the invention. Thus, the operation and behavior of the systems and methods were described without reference to the specific software code—it being understood that software and control hardware can be designed to implement the systems and methods based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   determining, by one or more devices, a quality score for each document of a plurality of documents,
      the quality score, for each document of the plurality of documents, identifying a measure of quality of the document,
   the plurality of documents including:
      a first document associated with an organization, and
      one or more second documents associated with one or more other organizations;
   generating, by the one or more devices, a value for the organization based on the quality score of the first document, the value indicating a likelihood that the organization copies content from the one or more other organizations; and using, by the one or more devices, the value to determine whether to index the first document as a representative document for the one or more second documents.

2. The method of claim 1, where using the value to determine whether to index the first document includes:
modifying the quality score for the first document, based on the value, to obtain a modified quality score; and
using the modified quality score to determine whether to index the first document.

3. The method of claim 2, where modifying the quality score for the first document includes:
mapping the value to a factor; and
using the factor to reduce the quality score for the first document.

4. The method of claim 3, where mapping the value to the factor includes:
mapping the value to the factor based on a threshold, the threshold being associated with the value.

5. The method of claim 1, where the first document and the one or more second documents are ranked based on the quality score for each document of the first document and the one or more second documents, and
where using the value to determine whether to index the first document includes:
demoting a rank of the first document based on the value; and
selecting another document, of the plurality of documents, as the representative document based on demoting the rank of the first document.

6. The method of claim 1, further comprising:
identifying a cluster that includes the first document and the one or more second documents,
where documents, in the cluster, are duplicate documents.

7. A system comprising:
one or more devices to:
determine a quality score for a first document of a plurality of documents,
the quality score identifying a measure of quality of the first document,
the plurality of documents including:
a first document associated with an organization, and
one or more second documents associated with one or more other organizations;
determine a value for the organization based on the quality score of the first document,
the value indicating a likelihood that the organization copies content from the one or more other organizations; and
use the value and the quality score to determine whether to select the first document as a representative document for the one or more second documents,
the representative document being indexed.

8. The system of claim 7, where, when using the value and the quality score to determine whether to index the first document, the one or more devices are to:
reduce the quality score for the first document, based on the value, to obtain a reduced quality score; and
use the reduced quality score to determine whether to index the first document.

9. The system of claim 8, where, when reducing the quality score for the first document, the one or more devices are to:
map the value to a particular value; and
use the particular value to reduce the quality score for the first document.

10. The system of claim 9, where, when mapping the value to the particular value, the one or more devices are to:
map the value to the particular value based on a threshold, the threshold being based on a range of values relating to the value.

11. A non-transitory computer-readable medium storing instructions, the instructions comprising:
one or more instructions that, when executed by one or more devices, cause the one or more devices to:
determine a quality score for a first document of a plurality of documents,
the quality score identifying a measure of quality of the first document,
the plurality of documents including:
a first document associated with an organization, and
one or more second documents associated with one or more other organizations;
determine a value for the organization based on the quality score of the first document,
the value indicating a likelihood that the organization copies content from the one or more other organizations; and
use the value and the quality score to determine whether to select the first document as a representative document for the one or more second documents.

12. The non-transitory computer-readable medium of claim 11, where the one or more instructions to use the value and the quality score to determine whether to select the first document as the representative document include:
one or more instructions to reduce the quality score for the first document, based on the value, to obtain a reduced quality score; and
one or more instructions to use the reduced quality score to determine whether to select the first document as the representative document.

13. The non-transitory computer-readable medium of claim 12, where the one or more instructions to reduce the quality score for the first document include:
one or more instructions to map the value to a particular value; and
one or more instructions to use the particular value to reduce the quality score for the first document.

14. A computer-implemented method comprising:
identifying a set of resources that are associated with a particular web site;
for each resource of the set:
identifying (i) a cluster of one or more resources to which the resource is assigned, and (ii) a quality score associated with the resource,
classifying the resource as belonging to one of multiple classifications based at least on (i) the quality score associated with the resource, and (ii) a quantity of zero or more other resources that are assigned to the same cluster and that are not associated with the particular web site, and
determining a classification score for the resource based on classifying the resource as belonging to one of multiple classifications;
generating, for each classification, an aggregated classification score for the website based at least on the determined classification scores for the resources of the set that are classified as belonging to the classification;

determining a proxy pad score for the website based at least on the respective aggregated classification score for each classification; and determining whether to index one or more of the resources of the set based at least on the proxy pad score.

15. The method of claim 14,
wherein one or more other resources are assigned to the same cluster,
wherein classifying the resources belonging to one of multiple classifications is further based on a respective quality score associated with the other resources.

16. The method of claim 14, wherein the aggregated classification score for each classification is the sum of the determined classification scores for each resource of the website that has been classified within the classification.

17. The method of claim 16, wherein determining the proxy pad score for the set of resources based at least on the respective aggregated classification score for each classification includes:
determining a weighted sum of the aggregated classification scores that correspond to each respective classification.

18. The method of claim 14, the method further comprising:
determining whether the proxy pad score exceeds a predetermined threshold; and
in response to determining that the proxy pad score exceeds the predetermined threshold, mapping the proxy pad score to a factor that reduces the quality score of a duplicate resource.

19. The method of claim 14, the method further comprising:
determining whether the proxy pad score exceeds a predetermined threshold; and
in response to determining that the proxy pad score does not exceed the predetermined threshold, mapping the proxy pad score to a factor that does not reduce the quality score of a duplicate resource.

20. The method of claim 14, the method further comprising:
demoting a duplicate resource's position in a ranked list by zero or more spots based on the value the corresponding website's proxy pad score.

21. A system comprising:
one or more computers and one or more storage devices storing instructions that are operable, when executed by the one or more computers, to cause the one or more computers to perform operations comprising:
identifying a set of resources that are associated with a particular web site; for each resource of the set:
identifying (i) a cluster of one or more resources to which the resource is assigned, and (ii) a quality score associated with the resource,
classifying the resource as belonging to one of multiple classifications based at least on (i) the quality score associated with the resource, and (ii) a quantity of zero or more other resources that are assigned to the same cluster and that are not associated with the particular web site, and
determining a classification score for the resource based on classifying the resource as belonging to one of multiple classifications; generating, for each classification, an aggregated classification score for the website based at least on the determined classification scores for the resources of the set that are classified as belonging to the classification;

determining a proxy pad score for the website based at least on the respective aggregated classification score for each classification; and
determining whether to index one or more of the resources of the set based at least on the proxy pad score.

22. The system of claim 21, wherein one or more other resources are assigned to the same cluster, wherein classifying the resources belonging to one of multiple classifications is further based on a respective quality score associated with the other resources.

23. The system of claim 21, wherein the aggregated classification score for each classification is the sum of the determined classification scores for each resource of the website that has been classified within the classification.

24. The system of claim 23, wherein determining the proxy pad score for the set of resources based at least on the respective aggregated classification score for each classification includes:
determining a weighted sum of the aggregated classification scores that correspond to each respective classification.

25. The system of claim 21, the operations further comprising:
determining whether the proxy pad score exceeds a predetermined threshold; and
in response to determining that the proxy pad score exceeds the predetermined threshold, mapping the proxy pad score to a factor that reduces the quality score of a duplicate resource.

26. The system of claim 21, the operations further comprising:
determining whether the proxy pad score exceeds a predetermined threshold; and
in response to determining that the proxy pad score does not exceed the predetermined threshold, mapping the proxy pad score to a factor that does not reduce the quality score of a duplicate resource.

27. The system of claim 21, the operations further comprising:
demoting a duplicate resource's position in a ranked list by zero or more spots based on the value the corresponding website's proxy pad score.

28. A non-transitory computer-readable medium storing software comprising instructions executable by one or more computers which, upon such execution, cause the one or more computers to perform operations comprising:
identifying a set of resources that are associated with a particular web site; for each resource of the set:
identifying (i) a cluster of one or more resources to which the resource is assigned, and (ii) a quality score associated with the resource,
classifying the resource as belonging to one of multiple classifications based at least on (i) the quality score associated with the resource, and (ii) a quantity of zero or more other resources that are assigned to the same cluster and that are not associated with the particular web site, and
determining a classification score for the resource based on classifying the resource as belonging to one of multiple classifications;
generating, for each classification, an aggregated classification score for the website based at least on the determined classification scores for the resources of the set that are classified as belonging to the classification;

determining a proxy pad score for the website based at least on the respective aggregated classification score for each classification; and determining whether to index one or more of the resources of the set based at least on the proxy pad score.

29. The computer-readable medium of claim 28, wherein one or more other resources are assigned to the same cluster, wherein classifying the resources belonging to one of multiple classifications is further based on a respective quality score associated with the other resources.

30. The computer-readable medium of claim 28, wherein the aggregated classification score for each classification is the sum of the determined classification scores for each resource of the website that has been classified within the classification.

31. The computer-readable medium of claim 30, wherein determining the proxy pad score for the set of resources based at least on the respective aggregated classification score for each classification includes:

determining a weighted sum of the aggregated classification scores that correspond to each respective classification.

32. The computer-readable medium of claim 28, the operations further comprising: determining whether the proxy pad score exceeds a predetermined threshold; and in response to determining that the proxy pad score exceeds the predetermined threshold, mapping the proxy pad score to a factor that reduces the quality score of a duplicate resource.

33. The computer-readable medium of claim 28, the operations further comprising: determining whether the proxy pad score exceeds a predetermined threshold; and in response to determining that the proxy pad score does not exceed the predetermined threshold, mapping the proxy pad score to a factor that does not reduce the quality score of a duplicate resource.

34. The computer-readable medium of claim 28, the operations further comprising: demoting a duplicate resource's position in a ranked list by zero or more spots based on the value the corresponding website's proxy pad score.

* * * * *